Figure 1:
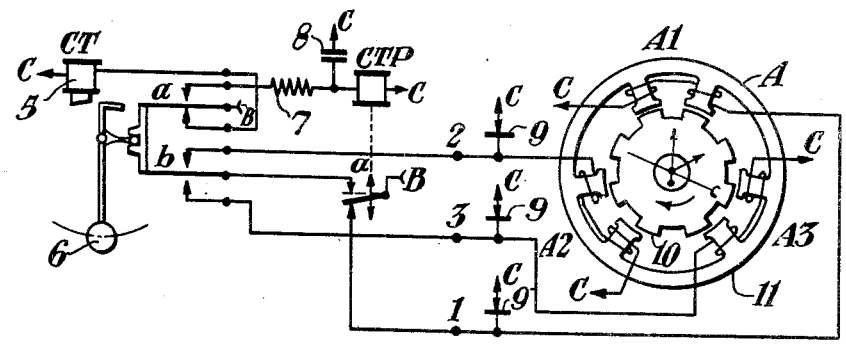

Aug. 2, 1949.                L. V. LEWIS                2,477,993
                PULSE COUNTING TIME MEASURING SYSTEM AND APPARATUS
Filed May 12, 1948                                    4 Sheets-Sheet 1

INVENTOR.
Lloyd V. Lewis.
BY
HIS ATTORNEY

INVENTOR.
Lloyd V. Lewis.
BY
HIS ATTORNEY

Aug. 2, 1949.  L. V. LEWIS  2,477,993
PULSE COUNTING TIME MEASURING SYSTEM AND APPARATUS
Filed May 12, 1948  4 Sheets-Sheet 3

INVENTOR.
Lloyd V. Lewis.
BY
HIS  ATTORNEY

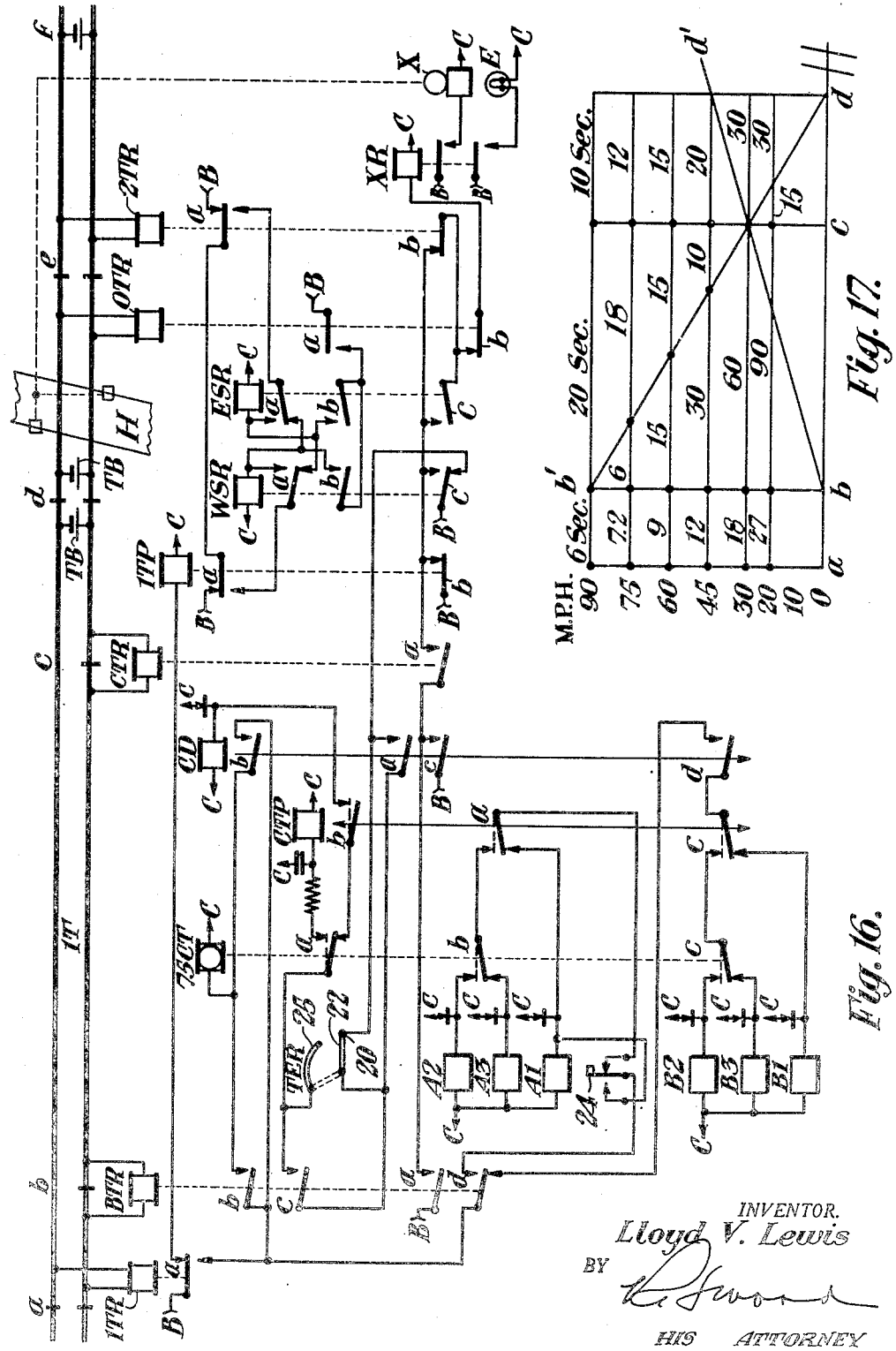

Patented Aug. 2, 1949

2,477,993

UNITED STATES PATENT OFFICE 2,477,993

PULSE COUNTING TIME-MEASURING SYSTEM AND APPARATUS

Lloyd V. Lewis, Pittsburgh, Pa., assignor to The Union Switch & Signal Company, Swissvale, Pa., a corporation of Pennsylvania Application May 12, 1948, Serial No. 26,528

29 Claims. (Cl. 318—45)

My invention relates to pulse counting apparatus for the measurement of time intervals, and to control systems embodying such apparatus.

In its specific form herein illustrated, the control system of my invention comprises a system for controlling highway crossing signals for railways of the type in which a warning signal is sounded or displayed at the crossing upon the approach of a train for a substantially uniform period of time, irrespective of the train speed, and is an improvement upon the system of that type disclosed in Letters Patent of the United States No. 1,934,094, issued November 7, 1933, to J. E. Saunders.

The principal feature of my invention is an improved time measuring device suitable for use in systems of the type referred to comprising a novel step by step motor mechanism which is adapted to measure time intervals by counting the number of pulses of a known periodicity received in the time interval which is to be measured. The motor of my invention comprises a toothed rotor of magnetic material controlled by a plurality of suitably spaced stator magnets, which when energized singly, serve to lock the rotor in different positions, and when energized successively turn the rotor in one direction or the other, depending upon the relative order in which the magnets are energized.

My invention also includes novel means for effecting the positive operation of a motor of the type referred to, in which a source of low frequency pulses and a timing relay controlled thereby produce repeated sequences of three or more pulses each for driving the motor in a particular direction. The driving pulses preferably are supplied by an electrically driven pendulum or "code transmitter," and the assembly comprising the pendulum, timing relay and motor constitutes a novel mechanism for converting pulsating motion to rotary motion. Furthermore, a mechanism embodying this principle of operation with the addition of indicating pointers driven by the motor through speed reducing gears is adapted to provide a self-contained electric clock suitable for general application.

In the embodiment of my invention herein illustrated in detail, a mechanism is provided in which a contact structure is driven by a motor of the type referred to in opposition to a constant biasing force such as gravity, so that the contacts are returned in a reliable manner to a normal position when the motor is deenergized.

This mechanism therefore embodies the closed circuit principle of operation and is adapted for use for railway signaling purposes, such for example as the highway crossing signal system referred to.

In this system, the mechanism is used to measure train speed by counting the pulses of a constant frequency received during the passage of a train between two fixed points, the biased contact member being thereby moved away from its normal position to a position corresponding to the train speed. A failure to respond to one or more of the pulses results in an indication higher than the actual speed, and so does not create an unsafe condition.

A particular advantage of the mechanism of my invention is that the contact member may also be constrained by the received pulses to operate step-by-step in the reverse direction so as to delay its return to normal for a time which depends upon the position to which the member has been moved.

As hereinafter described, this return period is employed to delay the actuation of a warning signal for a time which varies inversely with the measured train speed. Here again the failure to respond to one or more of the pulses allows the biasing force to accelerate the return to normal to shorten the delay time, which likewise is on the safe side.

A further advantage is that the contact member may readily be operated at different rates in the two directions either by supplying it with pulses at different rates or by the use of two motors having different numbers of rotor teeth. This is of advantage in enabling the timing section for measuring train speeds to be shortened with respect to the delay section in order to more accurately measure the speed of trains which are accelerated or retarded during their passage through the timing section.

One form of apparatus embodying my invention and various modifications thereof will now be described, and the novel features thereof will then be pointed out in claims.

Figure 2:
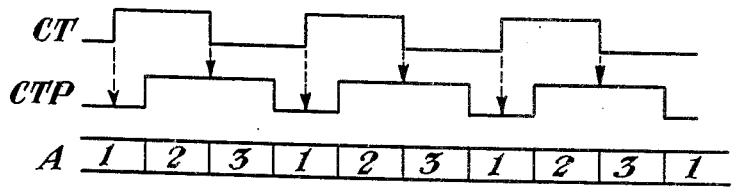
Figure 3:
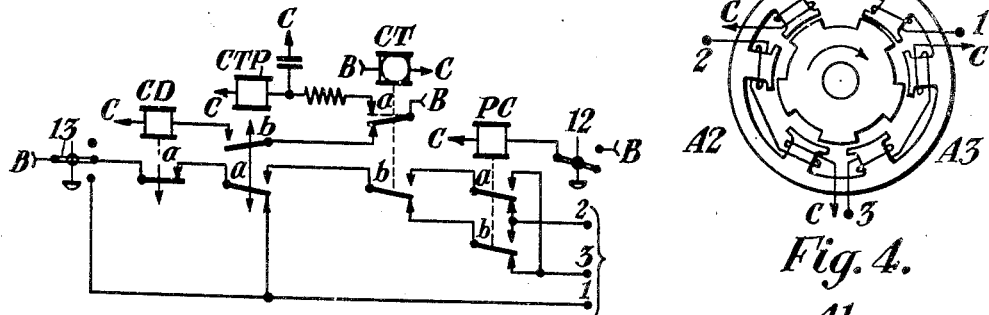
Figure 4:
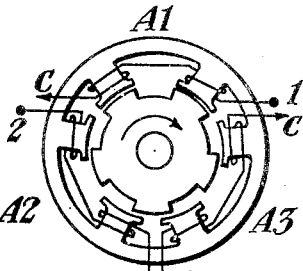
Figure 6:
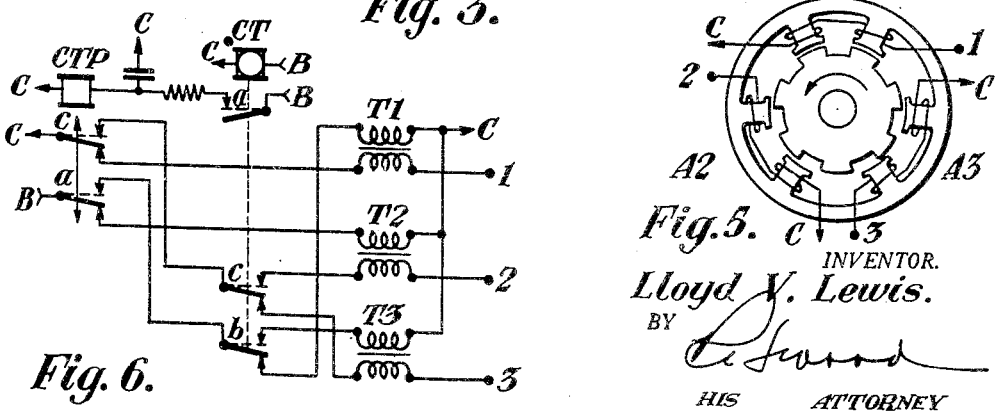
Figure 5:
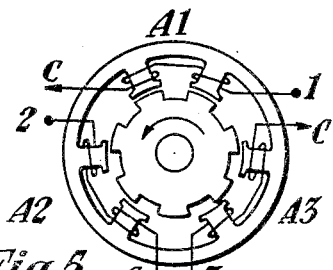
Figure 7:
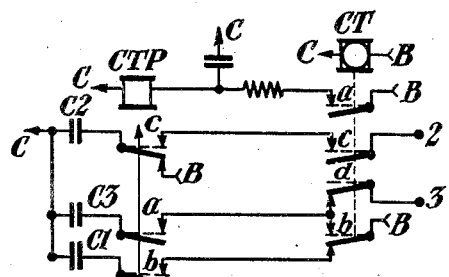
Figure 8:
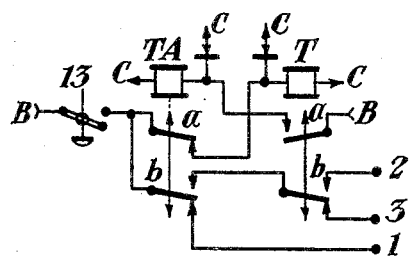
Figure 9:
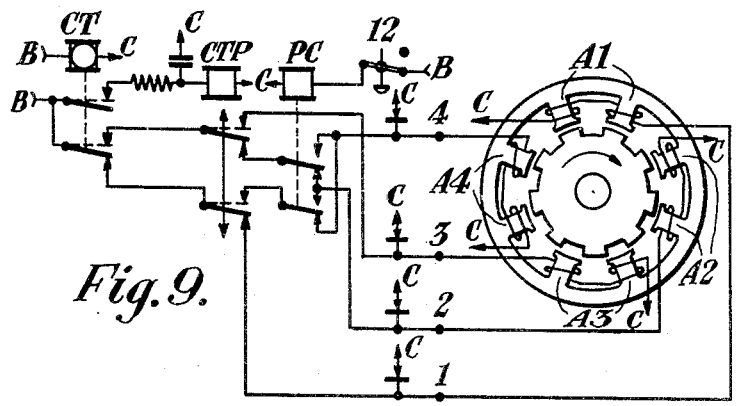
Figure 13:
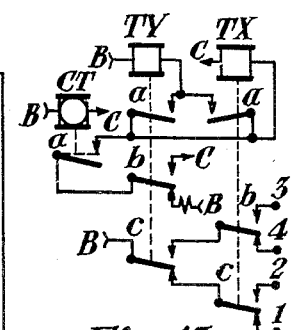
Figure 11:
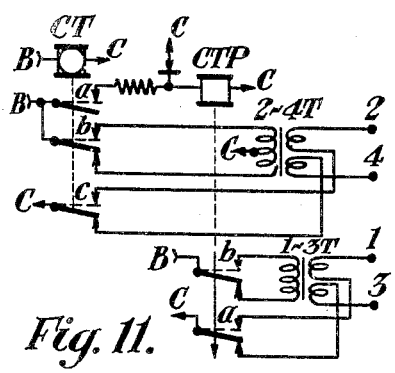
Figure 12:
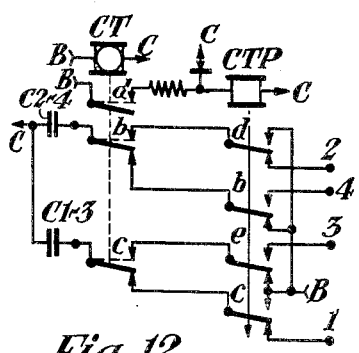
Figure 10:
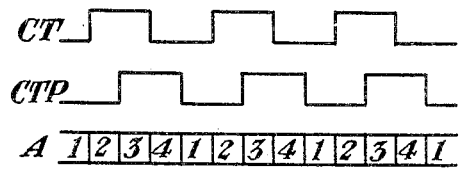
Figure 14:
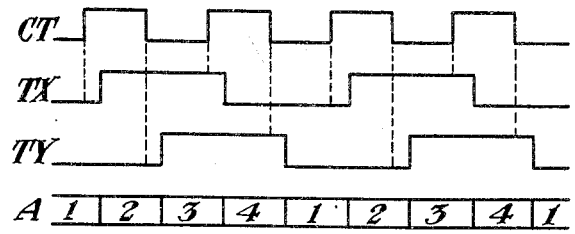
Figure 15:
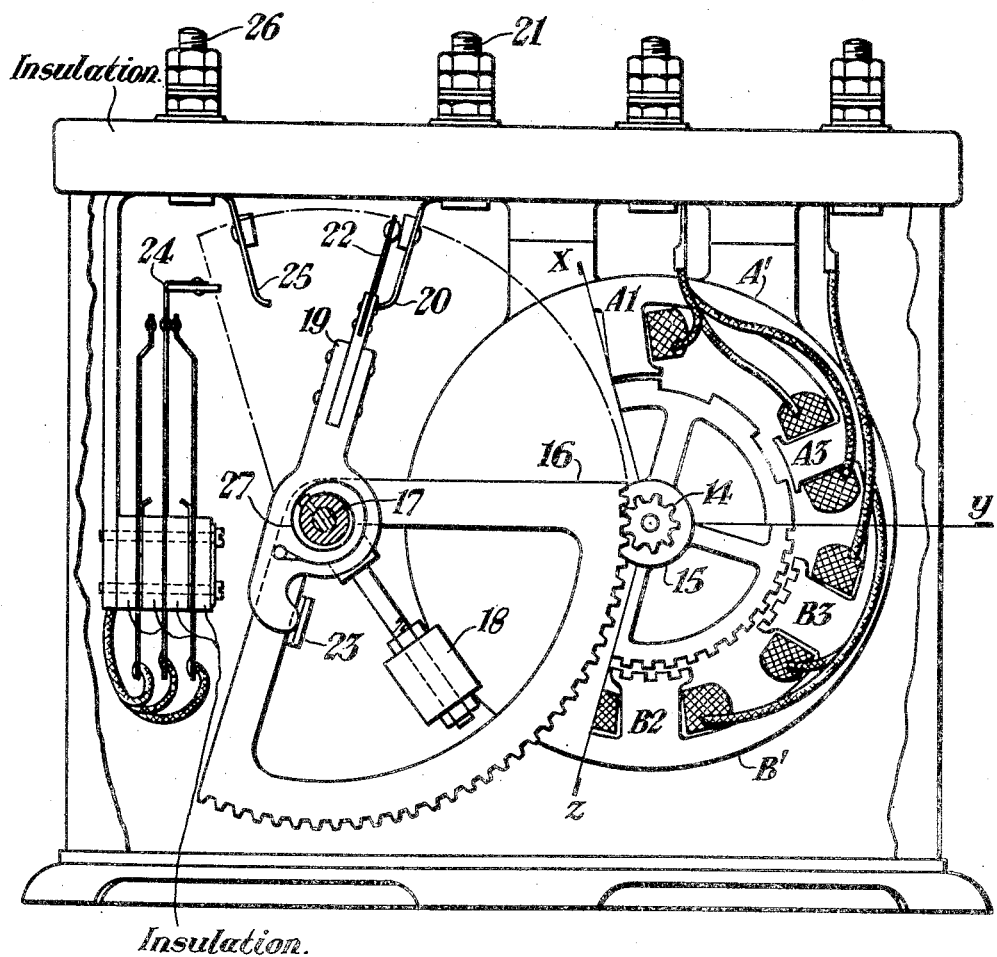

In the accompanying drawings, Fig. 1 shows one form of the impulse counting mechanism of my invention, constituting a self-contained electric clock. Fig. 2 is a timing chart showing the mode of operation of the mechanism of Fig. 1. Fig. 3 shows an alternative form of pulsing device by means of which the motor of Fig. 1 may be operated in either direction or may be locked energized in any position, or may be deenergized to free the rotor when the reception of pulses ceases. Figs. 4 and 5 show alternative forms of the motor of Fig. 1 having the same number of stator poles but operating at different rates and in opposite directions. Figs. 6, 7 and 8 show additional forms of the pulsing device for use with the motors of Fig. 1, 4 or 5. Figs. 9, 11 and 12 show further modifications employing an eight pole stator in place of the six pole stator of Figs. 1, 4 and 5. Fig. 10 is a timing chart showing the mode of operation of the mechanisms of Figs. 9, 11 and 12. Fig. 13 shows circuit means by which the motor of Fig. 9 may be operated at half speed, and Fig. 14 is a timing chart illustrating the mode of operation of the relays of Fig. 13. Fig. 15 is an elevation partly in section of a time element relay embodying my invention, in which two motors on a common shaft are adapted to operate a contact member in opposite directions at different rates for use in highway crossing signal system of the type referred to. Fig. 16 shows a track plan for a stretch of railway track including a highway crossing together with the circuits for one form of highway crossing control system embodying control by the time element relay of Fig. 16, while Fig. 17 is a time chart illustrating the operation of the system of Fig. 16 by trains at different speeds.

Similar reference characters refer to similar parts in each of the views.

To simplify the circuit drawings, only the terminals of the local source or sources of current are shown, the supply terminal being identified by the reference character B and the common return terminal by the reference character C in each instance.

Referring to Fig. 1, and more particularly to the left-hand portion comprising means for supplying sequences of unidirectional pulses to terminals 1, 2 and 3 of the motor M, the device CT comprises an electromagnet 5 adapted to maintain a pendulum 6 in oscillation at a substantially constant rate in a well-known manner, the magnets 5 being energized periodically by the closing of the lower contact a actuated by the pendulum. Each swing of the pendulum 5 toward the right closes its upper contacts a and b, and its contact a then completes a circuit from terminal B through a resistor 7 and the winding of a timing relay CTP, the pick up and release of which are regulated by the time constant of the circuit comprising the resistor 7 and a condenser 8 which is connected in parallel with the relay winding.

In the time chart, Fig. 2, the upper line designated CT indicates the positions assumed by the pendulum contacts as the pendulum of Fig. 1 oscillates, the line CTP indicates the positions of the relay contacts, and the third line indicates when energy is supplied to terminals 1, 2 and 3 of the magnets of the motor A. As shown in Fig. 1, when relay CTP is released, terminal B is connected to the motor terminal 1. Relay CTP picks up after a period which preferably is as shown in Fig. 2, that is, about one-sixth of the period or cycle of operation CT, and transfers terminal B from the motor terminal 1 to a circuit extending over the upper contact b of the device CT to the motor terminal 2. At the time corresponding to its half period, the pendulum CT opens its upper contacts, deenergizing relay CTP, and closes its lower contacts, and the pendulum contact b transfers terminal B from the motor terminal 2 to terminal 3. Then relay CTP releases after a period preferably about one-third the period of the device CT, and reconnects terminal B to the motor terminal 1. Each of the pulses due to the oscillation of the device is thus converted to a sequence of three unidirectional pulses, and these serve to operate the rotor 10 of motor A positively in a predetermined direction as will now be described.

The rotor 10 is of magnetizable material, and in the form shown in Fig. 1 has eight uniformly spaced polar projections or teeth each subtending an arc of 22.5 degrees. The stator 10 of magnetizable material has three pairs of poles carrying the windings A1, A2, and A3 connected between the motor terminals 1, 2, 3 and the common return terminal C.

Each stator pole, as well as each space between the two poles of a pair, also subtends 22.5 degrees, but the pairs are equally spaced 120 degrees apart so that the pairs of stator poles may be aligned with the rotor poles only one pair at a time.

As shown, magnets A1 are energized, the two windings being connected to produce oppositely directed magnetomotive forces and thereby produce a local field for attracting two of the rotor teeth to lock the rotor in the position shown. In this position, the rotor teeth adjacent the magnets A2 and A3 are displaced by an arc of 15 degrees, but in opposite directions and may be brought into alignment by deenergizing magnet A1 and simultaneously energizing magnet A2 or A3. It will be seen therefore that the rotor will be advanced three steps of 15 degrees each, per cycle of operation of the device CT, the movement being in the clockwise direction when the magnets are energized in the order 1, 2, 3 and in the counterclockwise direction when they are energized in the order 1, 3, 2. Since the rotor advances one tooth per cycle, the number of oscillations of the device CT for one revolution of the motor equals the number of rotor teeth.

Preferably, rectifier units 9 are connected in parallel with the motor windings as shown to provide a path for the inductive discharge currents due to circuit interruption, and serve to make the rotor motion more uniform and to eliminate contact sparking.

The rotor 10 may be used to drive the hands of a clock by conventional gearing as indicated diagrammatically in Fig. 1, and the second hand of the clock step will be advanced step by step in fifth-second intervals when the device CT operates at the rate of 100 cycles per minute. This may be reduced to 75 cycles per minute by using the alternative form providing four steps per cycle illustrated by Figs. 8 and 9. By comparison, a clock with the conventional mechanical escapement which indicates fifth second intervals requires a pendulum which oscillates 150 times per minute.

When this timing mechanism is used for control purposes the pendulum device CT is preferably of one of a type used in coded railway signaling systems and known as a "code transmitter," or it may be an ordinary relay which repeats the operation of such a device provided primarily for use elsewhere in the system. A device of the type referred to, adapted to supply electrical pulses at the rate of 75 per minute, is shown, for example, in Letters Patent of the United States No. 2,426,970, issued September 2, 1947, to A. Hufnagel.

Referring now to Fig. 3, the code transmitter CT and the timing relay CTP, as here shown, function as described above in connection with Fig. 1, but a code detector relay CD and a pole changer relay PC have been added. Relay CD is energized over contact a of the device CT and contact b of relay CTP during the periods for energizing magnet A—3 shown in the timing chart of Fig. 2, and is sufficiently slow in releasing to remain picked up during the periods for energizing magnets A1 and A2. Contact a of relay CD controls the supply of current from terminal B to terminals 1, 2 and 3, so that the motor A is energized only as long as the periodic operation of the device CT continues, the release of relay CD allowing the rotor 10 to turn freely under the influence of external forces. Relay PC illustrates typically one method of reversing the direction of rotation of the motor. As shown, the magnets are energized in the order 1, 2, 3, as indicated in Fig. 2, but when relay PC is energized by the closing of a contact 12, the magnets will be energized in the reverse order 1, 3, 2, as will readily be apparent.

The circuit controller 13 in Fig. 3 illustrates typically how the motor may be locked to prevent its further rotation after operation through a number of steps, magnet 1 becoming steadily energized upon movement of switch 13 to its lower position.

Figs. 6 and 7 show further modifications by which the supply of current to motor A may be made dependent upon the continued operation of the pulsing device CT. In Fig. 6, relay CTP is supplying energy over its back contact a to the primary of an impulse transformer T2 and the motor terminal 1 is connected through the secondary of a similar transformer T1 and back contact c of relay CTP to the motor return terminal C. When relay CTP picks up, its contact a interrupts the primary circuit for transformer T2, and its contact c shifts the secondary connections from terminal 1 to terminal 2, so that the current pulse induced in the secondary of transformer T2 due to the interruption of its primary circuit is supplied over front contacts c of the pulsing device CT to the motor magnet A2, connected to terminal 2. At the same time, the primary of transformer T3 becomes energized over front contact b of the device CT but without inducing a reverse current in the secondary circuit for transformer T3, because this is open at back contact c of the device CT.

When the device CT releases, its front contact b interrupts the primary circuit for transformer T3, and its contact c shifts the secondary connections from terminal 2 to terminal 3, so that the current impulse induced in the secondary of transformer T3 is supplied to the motor magnet A3 connected to terminal 3 and at the same time, the primary of transformer T1 becomes energized over front contact a of relay CTP and back contact b of the device CT, but without inducing reverse current in the secondary winding of transformer T1, the circuit for which is open at back contact c of relay CTP.

When relay CTP releases, its contact a interrupts the primary circuit for transformer T1 and its contact c shifts the secondary connections from terminal 3 to terminal 1, so that the current impulse induced in the secondary of transformer T1 is supplied to the motor magnet A1 connected to terminal 1, and at the same time the primary of transformer T2 becomes energized without inducing reverse current in its secondary winding, the circuit for which is open at contact c of the device CT. It will be seen therefore that the modification of Fig. 6 is adapted to supply unidirectional pulses to the magnets of motor A in the order 1, 2, 3, only as long as the pulsing device CT continues to operate.

In Fig. 7, the magnet terminals 1, 2, and 3 are supplied with unidirectional pulses of energy stored in three condensers C1, C2 and C3. During the energizing period for magnet A1 illustrated in Fig. 2, relay CTP is released and terminal 1 in Fig. 7 is supplied with the discharge current of condenser C1, and condenser C2 is being charged over back contact c of relay CTP. During the period when relay CTP and the device CT are both picked up, condenser C2 discharges over terminal 2 and a charge is stored in condenser C3, and when relay CTP is picked up and the device CT is released, condenser C3 discharges over terminal 3 and a charge is stored in condenser C1. It will be readily apparent that the apparatus of Fig. 7 is adapted to operate the motor in the same manner as that of Fig. 3 or 6.

Fig. 8 illustrates another means for supplying unidirectional pulses to the motor of Fig. 1, 4 or 5. In Fig. 8 the relays T and TA are ordinary relays interconnected in a well-known manner and are timed to pick up in a period which is about one-sixth, and to release in about one-third of the desired pulse period, like relay CTP in Fig. 2, and the pendulum device CT is not needed.

Relay T is picked up upon the release of relay TA and then energizes relay TA which picks up and deenergizes relay T. Relay T then releases and in turn releases relay TA. When the relays are timed as described, relay T operates with equal on and off periods like the device CT in Fig. 2, and the operation of relay TA corresponds to that of relay CTP in Fig. 2, and it follows that the contacts of these relays connected as shown are adapted to supply energy to the terminals 1, 2 and 3 sequentially in the manner indicated in Fig. 2.

In the three-circuit motor of the type discussed, the number of rotor teeth may be any number which is one more or less than a multiple of three, two basic forms being the five tooth rotor of Fig. 4 and the 7 tooth rotor of Fig. 5. It will be readily apparent that when the number of rotor teeth is 5, 8, 11, etc., the direction of rotor movement is negative or opposite to that of the rotating magnetic field, as shown by the 5 tooth rotor of Fig. 4 or the eight tooth rotor of Fig. 1, the latter being also shown in section $x$—$y$ in Fig. 15. On the other hand, when the number of rotor teeth is 7, 10, 13, etc., the rotor direction is positive or the same as that of the rotating field, as shown by the 7 tooth rotor of Fig. 5 and the 40 tooth rotor shown in the section $y$—$z$ in Fig. 15. The latter view shows a further modification, in which each stator pole is notched so as to cooperate with a plurality of rotor teeth, as is desirable when their number is large.

The number of pairs of stator poles may also be varied as desired, as illustrated by the four-circuit motor shown in Fig. 9. In this form, the eight stator poles may be arranged to match any rotor having uniformly spaced teeth, the number of which is one more or less than a multiple of four. In Fig. 9, the pick-up and release periods of the timing relay CTP are each preferably adjusted to approximately one-fourth the pulse period, as illustrated by the timing chart of Fig. 10. It is believed that in view of the similarity to Fig. 3, it will be clear without tracing the circuits in detail that in Fig. 9 the magnets A1 to A4 are energized successively in response to the pulses supplied by the device CT in the order 1, 2, 3, 4 when relay PC is released to effect clockwise rotation, and in the order 1, 4, 3, 2 when relay PC is energized to effect counterclockwise rotation.

It will also be evident that in each of the different forms described, the number of pulses required per revolution is determined by and is equal to the number of rotor teeth.

The four-circuit motor has the advantage that it may be inductively energized by the use of only two transformers or condensers.

In Fig. 11 it will be seen that contact $b$ of the device CT supplies current to the primary of the transformer 2—4T so as to induce impulses of alternately opposite polarity in its secondary windings which are oppositely connected to terminals 2 and 4 and to terminal C over contact $c$ of the device CT, which therefore supplies unidirectional impulses alternately over terminals 2 and 4 to the magnets A2 and A4 of the motor of Fig. 8. In a similar manner relay CTP supplies impulses to magnets A1 and A3 so that these are energized in the order 1, 2, 3, 4, as indicated in Fig. 10.

In Fig. 12 it will be seen that when the device CT and relay CTP are both released, condenser C2—4 is charged over the connection to terminal B which includes the back contacts $b$, and when the device CT picks up, condenser C2—4 discharges through the magnet A2 of Fig. 9 connected to terminal 2. When the device CT and relay CTP are both picked up, condenser C2—4 is charged over front contact $d$ of relay CTP, and when CT releases, condenser C2—4 discharges through magnet A4 connected to terminal 4. Condenser C1—3 is charged in a similar manner and discharges alternately through magnets A1 and A3 so that the four magnets are energized successively in the manner indicated in Fig. 10.

In Fig. 13 relay means are shown requiring two cycles of operation of the pulsing device CT to advance the motor of Fig. 9 through an angle corresponding to the tooth pitch thereby cutting its speed in half and enabling longer time elements to be measured.

In this view the device CT operates continuously as indicated by the time chart of Fig. 14. Relays TX and TY are ordinary relays having relatively short pick-up and relay periods, as indicated in the chart. When both relays TX and TY are released, the motor circuit extends from terminal B over their back contacts $c$ to terminal 1. When the device CT picks up, a circuit is closed from terminal B at back contact $b$ of relay TY over contact $a$ of CT through relay TX to terminal C, and relay TX picks up to shift the motor circuit from terminal 1 to terminal 2. Relay TY now has both terminals of its winding connected to terminal B due to the closing of contact $a$ of relay TX, and when contact $a$ of the device CT opens, relay TY picks up in series with relay TX, and contact $c$ of relay TY shifts the motor circuit from terminal 2 to terminal 3.

Due to the operation of contact $b$ of relay TY at this time, the next closing of contact $a$ of the device CT finds terminal C connected thereto and completes a stick circuit over front contacts $a$ and $b$ of relay TY to hold relay TY energized, while relay TX is short circuited and releases, shifting the motor circuit from terminal 3 to terminal 4.

The next opening of contact $a$ of the device CT releases relay TY which shifts the motor circuit from terminal 4 to terminal 1, thereby completing one cycle of operation of the relays and motor magnets but involving two cycles of operation of the pulsing device CT.

Referring now to Fig. 15, I have here shown a preferred form of time element mechanism embodying the motor of my invention.

As shown this mechanism comprises two motors A' and B' on a common shaft. Motor A', shown in the section $x$—$y$, is like that of Fig. 1 having eight rotor teeth, and turns step by step in the clockwise direction when its magnets are energized in the order 1, 2, 3. Motor B', shown in the section $y$—$z$, has 40 rotor teeth and like the motor of Fig. 5, rotates in the counterclockwise direction when its magnets are energized in the order B1, B2, B3. A pinion 14 coupled to the motor shaft by a conventional friction clutch 15 engages a gear segment 16 keyed to shaft 17. A counterweight 18 attached to shaft 17 provides a gravity bias tending to rotate the shaft assembly in the clockwise direction and causing this to assume the normal position shown when the motors are deenergized.

The shaft 17 provides a bearing for the free rotation of a contact arm 19 of insulating material carrying a contact spring 22. Normally contact 22 bridges a pair of fixed back contacts 20, of which but one is shown mounted on a top plate of insulating material and connected to terminal posts 21 thereon. A torsion spring 27, interposed between the shaft 17 and the contact arm 19, normally holds the arm 19 against an abutment 23 on segment 16. The force of gravity acting on segment 16 and counterweight 18 is transmitted through the abutment 23 to the arm 19 to maintain the contacts 20—22 normally closed.

The mechanism as shown is so proportioned that when motor A' is actuated by a device CT having a pulse rate of 75 per minute, segment 16 rotates through its full stroke in 27 seconds and then engages a contact member 24 corresponding in function to the circuit controller 13 of Fig. 3 by which the motor is held steadily energized and further rotation prevented.

The contact arm 19 rotates with segment 16 until contact 22 engages a pair of fixed front contacts 25 adjustably connected to terminal post 26.

As used in the highway crossing protection system of Fig. 16 hereinafter described, contact 22 engages contact 25 after six seconds operation of motor A', and during the further counterclockwise rotation of segment 16, the abutment 23 moves away from arm 19, and the contacts are held closed by the tension of spring 27 which adds somewhat to the biasing force and compensates for the decreasing effect of the counterweight 18 as the segment approaches the full stroke position.

Segment 16 may also be rotated counterclockwise by energizing motor B', in which case with a pulse rate of 75 per minute, contacts 22—25 would close in 30 seconds after segment 16 leaves the normal position and segment 16 would engage contact 24 after 135 seconds.

It will be readily apparent that this mechanism is suitable for general use for time interval measurements, and that it is particularly adapted for use in railway signaling systems for the time release of approach locking. For this application the mechanism is provided with a plurality of contact members 22 on shaft 17 similar to the one shown which engage different contacts 20 in the normal position, and engage contacts similar to 25 which are adjusted to close in different angular positions according to the time intervals to be measured, enabling a single mechanism to be substituted for a plurality of time element relays as used conventionally in systems of the character referred to.

In the system of Fig. 16, however, motor B' is employed for a different purpose, namely, to retard the return of the movable members to their normal position by the biasing forces following the deenergization of motor A'. Since the motors have a speed ratio of 5 to 1, it will be seen that if segment 16 is operated counterclockwise by motor A' for six seconds to just close contacts 22—25, and is then operated clockwise by motor B', the closing of contacts 22—20 will require 30 seconds. During an operation for 18 seconds, for example, by motor A', contacts 22—25 will close six seconds after contacts 22—20 open, and during the 90 second return operation by motor B', contacts 22—25 will open after 60 seconds, and contacts 22—20 will close 30 seconds later. In other words, following each operation of motor A' for a time $t$ between 6 and 27 seconds, motor B' will hold contacts 22—25 closed for an interval $5t$ minus 30 seconds.

Motor A' may be advantageously employed to register train speed by counting pulses during the passage of a train over a measured stretch of track for the control of safety devices in accordance with train speed and embodies the closed circuit principle, since a failure to count a required number of pulses may be due either to excessive speed or to a fault. The operation of motor B', as described above, also embodies the closed circuit principle, since the return of the mechanism to normal will be accelerated, indicating excessive speed in the event motor B' fails to retard segment 16 due to a fault.

Referring now to the highway crossing protection system of Fig. 16, the track plan at the top shows a stretch of railway track including a highway crossing H provided with conventional warning devices such as a bell X and lamp E, which are set into operation by the release of a normally energized relay XR. Relay XR is governed by directional relays WSR and ESR controlled by track relays in a conventional manner, the operation being that relay XR is released to actuate the warning devices upon the approach of a train from either direction and is reenergized to discontinue the operation of the warning devices as soon as the train is fully past the crossing. The rails are divided by insulated joints into three track sections including a short section 0T spanning the crossing having the track relay 0TR, and two approach sections 1T and 2T having the track relays 1TR and 2TR for governing the directional operation of relay XR.

The remaining apparatus of Fig. 16 is that provided in accordance with my invention for governing the time element device TER described in connection with Fig. 15 for the purpose of causing the warning devices to be actuated by eastbound trains, that is, by trains moving from left to right for a substantially uniform time regardless of their speed of approach, this time being nominally thirty seconds for a train approaching at any speed between 30 and 90 miles per hour. For the control of this apparatus the track relay 1TR is located at point $a$ at the end of section 1T remote from the crossing, and controls a repeating relay 1TP located at point $d$. Section 1T is subdivided by insulated joints at points $b$ and $c$ bridged by low resistance series relays BTR and CTR which pick up when an eastbound train passes point $a$ and release in turn as the train passes points $b$ and $c$. Section 1T is thereby arranged to provide a timing section $a$—$b$, a delay section $b$—$c$, and a positive warning section $c$—$d$.

In the time chart of Fig. 17, the abscissae represent distance and indicate the relative locations of the points $a$ to $d$ on the track plan and the ordinates indicate different train speeds in miles per hour, while the numbers above the horizontal lines indicate the time in seconds required to traverse the sections at different constant speeds in miles per hour as indicated at the left-hand margin of Fig. 17. It will be seen that section $c$—$d$ has one-third the length of the warning section $b$—$d$ which provides a 30 second warning for trains at 90 miles per hour and that the timing section $a$—$b$ has one-fifth the length of section $b$—$d$.

Briefly described, in the system of Fig. 16 the motor A' of the time element relay of Fig. 15 is actuated when an eastbound train passes point $a$ and is released when it passes point $b$, and contacts 22—25 close if the measured time exceeds six seconds. Motor B' is actuated at point $b$ to return the motor mechanism to normal at one-fifth speed so that the opening of contacts 22—25 is delayed until the train reaches a point indicated by the intersection of the horizontal line, representing its speed, with the diagonal line $b'$—$d$. At this point relay XR is released to actuate the warning devices by the opening of contacts 22—25, unless the delay is sufficient to enable the train to reach point $c$, in which case the circuit for relay XR is opened at point $c$ by the release of the auxiliary track relay CTR.

It will be evident that if due to a fault the operation of the pulsing device 15CT or of relay CTP ceases while the train is in section $b$—$c$, or if the motor magnets B1—B3 fail to receive pulses, the opening of contacts 22—25 and the release of relay CD will be accelerated and the delay period shortened.

The positive warning section $c$—$d$ is provided in order to provide an adequate warning time in the event a train accelerates in any of the sections. Thus, for example, if a train has an average speed of 30 miles per hour in section $a$—$b$, it will acquire a delay period of 60 seconds regardless of its subsequent speed. This however is the time required to reach point $c$ only if the train speed is held constant at its measured speed of 30 miles per hour. Since at any speed the distance traversed in a given time is proportional to the average speed, the train having a 60 second delay period but having an average speed greater or less than 30 miles per hour after passing point $b$ would reach a point represented in Fig. 17 by the intersection of the horizontal line corresponding to its speed with the diagonal line $b$—$d'$ and in the case of a rapidly accelerating train, the warning time might be unduly shortened were it not for the provision of the positive warning section $c$—$d$ involving the control of relay XR by relay CTR. From the chart it will be clear that if the speed measured in section $a$—$b$ is 30 miles per hour or less, for example, and the train accelerates so that its average speed is 45 miles per hour in section $c$—$d$, a 20 second warning period is provided, while if it accelerates to 60 miles per hour, a 15 second warning period is provided.

It will also be understood that in practice the release times of certain of the relays must be allowed for in connection with the time chart of Fig. 17, but since this factor is relatively small it has been disregarded herein in order to simplify the description.

Considering now the operation of the system of Fig. 16 in detail, it will be seen that when an eastbound train enters section IT, relay ITR releases and relays BTR and CTR pick up in response to the increased flow of current from the track battery TB due to the shunting of relay ITR by the wheels and axles of the train. Relay ITP releases and completes a circuit from terminal B at front contact $a$ of relay 2TR over back contacts $a$ of relays ITP and WSR through relay ESR to terminal C so that relay ESR picks up. Relay XR, which normally is energized over front contacts $b$ of relays 0TR and 2TR from terminal B at contact $b$ of relay ITP, is now energized over contact $b$ of relay 0TR, contact $c$ of relay ESR, contact $a$ of relay CTR from terminal B at contact $a$ of relay BTR. The closing of back contact $a$ of relay ITR and of contact $b$ of relay BTR energizes the pulsing device 75CT, which operates its contacts 75 times per minute. Relays CTP and CD are supplied with energy from terminal B at back contact $c$ of relay WSR over contacts 22—20 of the time element mechanism TER and contact $c$ of relay BTR, and the motor magnets A1, A2, and A3 are supplied with energy from terminal B at back contact $a$ of relay ITR over front contact $d$ of relay BTR, contact 24 of the time element device, contact $a$ of relay CTP and contact $b$ of the pulsing device 75CT. It follows that the mechanism will operate as already described in connection with Figs. 1, 3 and 15 to move contact 22 in the counterclockwise direction at a predetermined rate. Relay CD assumes its energized position and its contact $a$ provides a connection to terminal B for maintaining the system in operation after contact 22—20 opens.

The dropping of contact $d$ of relay BTR when the train passes point $b$ opens the circuit for magnets A1, A2 and A3 and completes one for magnets B1, B2 and B3. If contact 22—25 is open, as is the case when the train traverses section $a$—$b$ in six seconds or less, relays CD and CTP are released by the opening of contact $c$ of relay BTR. In this case the opening of contact $a$ of relay BTR and of contact $c$ of relay CD releases relay XR to actuate the warning devices shortly after the train passes point $b$, and the motor magnets B1—B3 are deenergized by the opening of contact $d$ of relay CD to allow the return of the contact member 19 to normal.

If the traverse time of section $a$—$b$ is more than six seconds, contact 22—25 is closed and supplies current to relays CD and CTP, and magnets B1, B2 and B3 are energized over contacts $c$ of relay CTP and the device 75CT to delay the opening of contacts 22—25 for a time proportional to the amount by which the traverse time of section $a$—$b$ exceeds six seconds as shown by Fig. 17. Relay XR is released by relay CD at the end of this delay period, or by the opening of contact $a$ of relay CTR in the event the delay period exceeds the traverse time of section $b$—$c$.

When the eastbound train occupies section 0T, relay ESR is held energized over a stick circuit including its own front contact $b$ and back contact $a$ of relay 0TR, and after it enters section 2T and vacates section IT, relay ESR is held energized over a stick circuit including its own front contact $a$, back contact $a$ of relay 2TR, and front contact $a$ of relay ITP, relay XR becoming reenergized as soon as the train vacates section 0T.

When a westbound train traverses the stretch shown in Fig. 16, it will be clear that relay WSR will become energized in place of relay ESR, and that relay XR will be released by relay 2TR when the westbound train enters section 2T and will be reenergized over front contact $c$ of relay WSR when this train vacates section 0T. The opening of back contact $c$ of relay WSR prevents the operation of the time element device TER by westbound trains.

It will be evident that in the system described a mechanism having but a single motor could have been used, by providing means for reversing its direction, like relay PC in Fig. 3, and by making the length of section $a$—$b$ equal to that of section $b$—$d$ or by the provision of two pulsing devices CT operating at different rates corresponding to the relative lengths of these two sections.

In the foregoing I have illustrated various types of time measuring devices embodying my invention and have illustrated a specific application of the device to a system of highway traffic control, but it is to be understood that this device is also suitable for use in other systems for the reliable measurement of time intervals, and that various changes and modifications may be made therein within the scope of the appended claims without departing from the spirit and scope of my invention.

Having thus described my invention, what I claim is:

1. Apparatus for counting electrical pulses comprising a pulsing relay responsive to said pulses, a timing relay controlled by said pulsing relay and repeating its operation, a motor having a toothed rotor of magnetic material and a stator cooperating therewith having at least three stator magnets, and means controlled jointly by contacts of said pulsing relay and of said timing relay for energizing said magnets one at a time in a repeated sequential order to effect the step-by-step movement of said rotor.

2. Apparatus for counting electrical pulses comprising a pulsing relay responsive to each of said pulses, a timing relay controlled by said pulsing relay and adapted to repeat each operation thereof after a predetermined delay period, a motor having at least three stator magnets and a toothed rotor of magnetic material adapted to rotate step-by-step in responsive to the successive energization of said magnets, and circuits controlled by contacts of said pulsing relay and of said timing relay for energizing each of said magnets in turn in response to each cycle of operation of said pulsing relay.

3. Apparatus for counting electrical pulses comprising a pulsing relay responsive to each of said pulses, a timing relay controlled by said pulsing relay and adapted to repeat each operation thereof after a predetermined time which is less than the interval between pulses, a motor having a salient pole stator having at least three windings thereon and a toothed rotor adapted to assume a different angular position in response to the energization of each of said windings, and circuits controlled by contacts of said pulsing relay and of said timing relay for energizing each of said magnets in turn for substantially equal periods of time during each cycle of operation of said pulsing relay.

4. Pulse counting apparatus comprising a motor having a toothed rotor of magnetic material and a plurality of stator magnets cooperating therewith, a pulsing relay operated periodically by electrical pulses, a timing relay controlled by the pulsing relay for repeating its operation, and stepping circuits including contacts of said pulsing and timing relays for supplying unidirectional pulses to each of said magnets in a repeated sequential order to effect the step-by-step movement of said rotor.

5. Pulse counting apparatus comprising a motor having a toothed rotor and at least three stator magnets which cooperate therewith in different angular positions to effect its step-by-step rotation when the magnets are successively energized, a pulsing relay operated periodically by electrical pulses, a timing relay controlled by the pulsing relay for repeating each operation thereof after a delay period, a source of current, and circuits including contacts of said pulsing and timing relays for supplying current from said source to each of said magnets in turn for substantially equal periods of time, during each cycle of operation of said pulsing relay.

6. Time measuring apparatus comprising a motor having a toothed rotor and at least three stator magnets which cooperate therewith to effect its step-by-step rotation when the magnets are successively energized, an electrically driven pendulum, a timing relay, means controlled by said pendulum for energizing said relay once during each cycle of operation of said pendulum, a source of current, and circuits including contacts operated by said pendulum and contacts of said relay for supplying current from said source to each of said magnets in turn for substantially equal periods of time during each cycle of operation of said pendulum.

7. Time measuring apparatus comprising a motor having a toothed rotor and at least three stator magnets each having two poles in alignment with adjacent rotor teeth in different equiangular positions, the number of rotor teeth being either one more or one less than an integral multiple of the number of stator magnets, a continuously operating pendulum, a timing relay energized by said pendulum once during each cycle of its operation, and circuits controlled by contacts operated by said pendulum and contacts of said timing relay for energizing each of said magnets in turn, for substantially equal periods of time, during each cycle of operation of said pendulum, to effect the step-by-step operation of said motor.

8. Pulse counting apparatus comprising a motor having a rotor and a stator of magnetic material, said rotor having equally spaced teeth, said stator comprising at least three spaced magnets each having two poles which align with adjacent rotor teeth in different equiangular positions, the number of rotor teeth being either one more or one less than an integral multiple of the number of stator magnets, means for energizing said magnets in sequence to bring the rotor teeth successively into alignment with the poles of each of said magnets in turn to thereby effect its step-by-step rotation.

9. Time measuring apparatus comprising a motor having a toothed rotor and at least three stator magnets which cooperate therewith in different equiangular positions, a periodically operated pulsing relay, a timing relay controlled by said pulsing relay for repeating each operation thereof after a delay period, and circuits including contacts of said pulsing relay and of said timing relay for energizing each of said magnets in turn to advance said rotor through at least three successive positions during each cycle of operation of said pulsing relay.

10. Pulse counting apparatus comprising a motor having a toothed rotor and at least three stator magnets which cooperate therewith in different angular positions to effect its step-by-step rotation when the magnets are successively energized, a pulsing relay operated periodically by the pulses which are to be counted, a timing relay controlled by the pulsing relay and repeating each operation thereof after a delay period, a source of current, stepping circuits including contacts of said pulsing and timing relays for supplying current from said source to each of said magnets in turn to effect the step-by-step operation of said rotor in a direction dependent upon the relative order of energization of said magnets, and means for interchanging the connections of at least two of said magnets to thereby reverse the direction of operation of said rotor.

11. Pulse counting apparatus comprising a motor having a toothed rotor biased to a normal position and at least three stator magnets which cooperate therewith in different angular positions to effect the step-by-step movement of said rotor when the magnets are successively energized, a pulsing relay operated periodically by the pulses which are to be counted, a timing relay controlled by the pulsing relay and repeating each operation thereof after a delay period, a source of current, stepping circuits including contacts of said pulsing and timing relays for supplying current from said source to each of said magnets in turn to effect the step-by-step operation of said rotor in a direction dependent upon the relative order of energization of said magnets, and a holding circuit for one of said magnets only, for locking said rotor to prevent its return to its normal position after a predetermined number of pulses have been counted by said apparatus.

12. Pulse counting apparatus comprising a motor having a toothed rotor biased to a normal position and at least three stator magnets which cooperate therewith in different angular positions to effect the step-by-step movement of said rotor when the magnets are successively energized, a pulsing relay operated periodically by the pulses which are to be counted, a timing relay controlled by the pulsing relay and repeating each operation thereof after a delay period, a source of current, stepping circuits including contacts of said pulsing and timing relays for supplying current from said source to each of said magnets in turn to effect the step-by-step operation of said rotor away from said normal position by an amount corresponding to the number of operations of said pulsing relay, and holding means for energizing one of said magnets only to prevent the return of said rotor to its normal position after a predetermined number of pulses have been counted, until said holding means is released.

13. Pulse counting apparatus comprising a motor having a toothed rotor biased to a normal position and at least three stator magnets which cooperate therewith in different angular positions to effect the step-by-step movement of said rotor when the magnets are successively energized, a pulsing relay operated periodically by the pulses which are to be counted, a timing relay controlled by the pulsing relay and repeating each operation thereof after a delay period, a source of current, stepping circuits including contacts of said pulsing and timing relays for supplying current from said source to each of said magnets in turn to effect the step-by-step operation of said rotor in the direction to which said rotor is biased, following a movement of said rotor away from its normal position, whereby the movement of the rotor to its normal position is delayed until a predetermined number of pulses have been counted by said apparatus.

14. Pulse counting apparatus comprising a motor having a toothed rotor biased to a normal position and at least three stator magnets which cooperate therewith in different angular positions to effect the step-by-step movement of said rotor when the magnets are successively energized, a pulsing relay operated periodically by the pulses which are to be counted, a timing relay controlled by the pulsing relay and repeating each operation thereof after a delay period, a source of current, stepping circuits including contacts of said pulsing and timing relays for supplying current from said source to each of said magnets in turn to effect the step-by-step operation of said rotor away from the normal position to which it is biased, and means responsive to the cessation of the periodic operation of said pulsing relay for deenergizing said magnets to thereby effect the return of the rotor to its normal position.

15. Pulse counting apparatus comprising a motor having a toothed rotor biased to a normal position and at least three stator magnets which cooperate therewith in different angular positions to effect the step-by-step movement of said rotor when the magnets are successively energized, a pulsing relay operated periodically by the pulses which are to be counted, a timing relay controlled by the pulsing relay and repeating each operation thereof after a delay period, a source of current, stepping circuits including contacts of said pulsing and timing relays for supplying current from said source to each of said magnets in turn to effect the step-by-step operation of said rotor away from the normal position to which it is biased, a detector relay, means dependent upon the continued operation of said pulsing relay for maintaining said detector relay energized, and means controlled by said detector relay when released for deenergizing said magnets to thereby effect the return of the rotor to its normal position.

16. Pulse counting apparatus comprising a motor having a toothed rotor and at least three stator magnets which cooperate therewith in different equiangular positions to effect its step-by-step rotation when the magnets are successively energized, a pulsing relay operated periodically by electrical pulses, a timing relay controlled by the pulsing relay for repeating each operation thereof after a delay period, a source of current, a plurality of transformers having primary and secondary windings, means controlled by said relays for connecting said primary windings successive to said source to store electrical energy therein, and means controlled by said relays for connecting said secondary windings successively to different ones of said stator magnets to effect their energization by said stored energy and thereby cause the step-by-step operation of said rotor.

17. Pulse counting apparatus comprising a motor having a toothed rotor and at least three stator magnets which cooperate therewith in different equiangular positions to effect its step-by-step rotation when the magnets are successively energized, a pulsing relay operated periodically by electrical pulses, a timing relay controlled by the pulsing relay for repeating each operation thereof after a delay period, a source of current, a plurality of condensers, means controlled by said relays for connecting said condensers successively to said source to store electrical energy therein, and means controlled by said relays for connecting said condensers to different ones of said stator magnets to effect their energization by stored energy and thereby cause the step-by-step operation of said rotor.

18. Pulse counting apparatus comprising a motor having a toothed rotor and three stator magnets which cooperate therewith having poles which align with the adjacent rotor teeth in different angular positions whereby the rotor is moved step-by-step when the magnets are successively energized, a pulsing relay operated by the pulses which are to be counted, a timing relay which repeats each operation of the pulsing relay after a delay period, a circuit for one stator magnet including a normal contact of said timing relay, and circuits for the other two stator magnets including a reverse contact of said timing relay and normal and reverse contacts, respectively, of said pulsing relay.

19. Pulse counting apparatus comprising a motor having a toothed rotor and at least three stator magnets which cooperate with said rotor in different angular positions to effect its step-by-step operation when the magnets are successively energized in a given order, a contact member arranged to be driven in a particular direction by said motor, biasing means for driving the contact member in the opposite direction toward a normal position, means responsive to the pulses to be counted for energizing said magnets to effect the movement of said member from its normal position to a position which indicates the number of pulses received, a checking contact closed by said member in its normal position, and an adjustable control contact closed by said member when it assumes a position indicating the reception of a selected number of pluses.

20. Pulse counting apparatus comprising a motor having a toothed rotor and at least three stator magnets which cooperate with said rotor in different angular positions to effect its step-by-step operation when the magnets are successively energized in a given order, a contact member arranged to be driven in a particular direction by said motor, biasing means for driving the contact member in the opposite direction toward a normal position, means responsive to the pulses to be counted for energizing said magnets to effect the movement of said member from its normal position to a position which indicates the number of pulses received, a checking contact closed by said member in its normal position, means preventing the energization of said motor by a series of pulses unless the first pulse is received when said checking contact is closed, and a control contact closed by said member when it assumes a position indicating the reception of a selected number of pulses.

21. Pulse counting apparatus comprising a motor having a toothed rotor and at least three stator magnets which cooperate with said rotor in different angular positions to effect its step-by-step operation when the magnets are successively energized in a given order, a contact member arranged to be driven in a particular direction by said motor, biasing means for driving the contact member in the opposite direction toward a normal position, means responsive to the pulses to be counted for energizing said magnets to effect the movement of said member from its normal position to a position which indicates the number of pulses received, a control contact closed by said member when it assumes a position indicating the reception of a selected number of pulses, and resilient means for maintaining said contact closed during the further movement of said member due to the reception of additional pulses.

22. Pulse counting apparatus comprising a motor having a toothed rotor and at least three stator magnets which cooperate with said rotor in different angular positions to effect its step-by-step operation when the magnets are successively energized in a given order, a contact member arranged to be driven in a particular direction by said motor, biasing means for driving the contact member in the opposite direction toward a normal position, means responsive to the pulses to be counted for energizing said magnets to effect the movement of said member from its normal position to a position which indicates the number of pulses received, a control contact closed by said member when it assumes a position indicating the reception of a selected number of pulses, means for maintaining said contact closed during the further movement of said member due to the reception of additional pulses, and means for retarding the return movement of said member by said biasing means to cause said control contact to remain closed for a time proportional to the number of additional pulses indicated by the position of said member.

23. Pulse counting apparatus comprising a motor having a toothed rotor and at least three stator magnets which cooperate with said rotor in different angular positions to effect its step-by-step operation when the magnets are successively energized in a given order, a contact member arranged to be driven in a particular direction by said motor, biasing means for driving the contact member in the opposite direction toward a normal position, means responsive to the pulses to be counted for energizing said magnets to effect the movement of said member from its normal position to a position which indicates the number of pulses received, a control contact closed by said member when it assumes a position indicating the reception of a selected number of pulses, means for maintaining said contact closed during the further movement of said member due to the reception of additional pulses, the pulse responsive means rendered effective after the reception of said additional pulses to cause said member to move in the reverse direction at a rate proportional to its rate of movement due to said pulses, thereby delaying its return to normal by the action of said biasing means.

24. Pulse counting apparatus comprising a motor having a toothed rotor and at least three stator magnets which cooperate with said rotor in different angular positions to effect its step-by-step operation when the magnets are successively energized in a given order, a contact member arranged to be driven in a particular direction by said motor, biasing means for driving the contact member in the opposite direction toward a normal position, means responsive to the pulses to be counted for energizing said magnets to effect the movement of said member from its normal position to a position which indicates the number of pulses received, a control contact closed by said member when it assumes a position corresponding to the reception of a selected number of pulses, said contact remaining closed during the further movement of said member due to the reception of additional pulses, and means for retarding the return movement of said member toward its normal position at a rate proportional to its rate of movement by said pulses to cause said control contact to remain closed after the reception of said additional pulses for a time determined by the position assumed by the contact member due to said further movement.

25. Pulse counting apparatus comprising a motor having a toothed rotor and at least three stator magnets which cooperate with said rotor in different angular positions to effect its step-by-step operation when the magnets are successively energized in a given order, a contact member arranged to be driven in a particular direction by said motor, biasing means for driving the contact member in the opposite direction toward a normal position, means responsive to the pulses to be counted for energizing said magnets to effect the movement of said member from its normal position to a position which indicates the number of pulses received, a control contact closed by said member when it assumes a position indicating the reception of a selected number of pulses, means for maintaining said contact closed during the further movement of said member due to the reception of additional pulses, and pulse responsive retarding means rendered effective after the reception of said additional pulses to prevent the opening of said control contact by the action of said biasing means until a number of pulses has been received by said retarding means which is proportional to the number of additional pulses received after said control contact closed.

26. Pulse counting apparatus comprising a motor having a toother rotor and at least three stator magnets which cooperate with said rotor in different angular positions to effect its step-by-step operation when the magnets are successively energized in a given order, a contact member arranged to be driven in a particular direction by said motor, biasing means for driving the contact member in the opposite direction toward a normal position, means responsive to the pulses to be counted for energizing said magnets to effect the movement of said member from its normal position to a position which indicates the number of pulses received, a control contact closed by said member when it assumes a position indicating the reception of a selected number of pulses, said control contact remaining closed during the reception of additional pulses, and retarding means effective upon the cessation of said additional pulses for delaying the movement of said member by said biasing means to the position where said contact opens for a time which is relatively long but is proportional to the time of reception of said additional pulses.

27. Pulse counting apparatus comprising a first and a second motor on a common shaft each having a toothed rotor and at least three stator magnets which cooperate therewith in different angular positions to effect the step-by-step movement of said rotor when the magnets are successively energized in a given order, a contact member arranged to be driven in a particular direction by the first motor and in the opposite direction by the second motor, biasing means arranged to drive the contact member in the same direction as the second motor, whereby said member is caused to assume a normal position when both motors are deenergized, means responsive to the pulses to be counted for energizing the magnets of said first motor to effect the movement of said member from its normal position by an amount which indicates the number of pulses received, a control contact closed by said member when it assumes a position indicating the reception of a selected number of pulses, means for maintaining said contact closed during the further movement of said member due to the reception of additional pulses, and means for deenergizing the first motor and for energizing the second motor by a series of pulses following the reception of said additional pulses, said second motor serving to prevent the opening of said control contact by the action of said biasing means until a number of pulses has been received which is proportional to the number of additional pulses received after said control contact closed.

28. Pulse counting apparatus comprising a first and a second pulse counting motor each arranged to operate step-by-step in response to the reception of a series of electrical pulses, a contact member arranged to be driven away from a normal position when said first motor is supplied with pulses and toward said normal position at a relatively slower but proportional rate when the second motor is supplied with pulses, and biasing means constantly effective and acting to drive the contact member toward said normal position when said motors are deenergized.

29. Pulse counting apparatus comprising a first and a second pulse counting motor each arranged to operate step-by-step in response to the reception of a series of electrical pulses, a contact member biased toward a normal position, means acting when said first motor is supplied with a series of pulses for moving said contact member from said normal position to a position indicating the number of pulses received, means acting if said second motor is supplied with pulses following the reception of said series by the first motor, for limiting the rate of return of said member to normal to a rate which depends upon the rate of reception of said pulses by the second motor, a detector relay, means for maintaining said relay energized only during the reception of pulses, and means effective upon the release of said detector relay for deenergizing said motors.

LLOYD V. LEWIS.

No references cited.